United States Patent [19]

Sheehan et al.

[11] Patent Number: 4,896,422
[45] Date of Patent: Jan. 30, 1990

[54] FISHING LINE CUTTER

[75] Inventors: Larry A. Sheehan, Springfield; John R. James, Cassville, both of Mo.

[73] Assignee: Bo-James Co., Inc., Cassville, Mo.

[21] Appl. No.: 178,484

[22] Filed: Apr. 7, 1988

[51] Int. Cl.$^4$ ............................................. A01K 91/00
[52] U.S. Cl. ..................................... 30/290; 30/296.1; 43/25
[58] Field of Search ................. 30/127, 278, 287, 289, 30/290, 296 R, 296 A; 7/106; 43/25

[56] References Cited

U.S. PATENT DOCUMENTS

| | | | |
|---|---|---|---|
| 419,271 | 1/1890 | Low | 30/289 |
| 1,493,354 | 5/1924 | Linnehan | 30/290 |
| 3,419,924 | 1/1969 | Archibald . | |
| 3,447,173 | 6/1969 | Kleiman . | |
| 4,144,605 | 3/1979 | Eberhardt | 7/106 |
| 4,484,368 | 11/1984 | Thompson | 7/106 |
| 4,708,044 | 11/1987 | Adams | 30/290 A |
| 4,726,140 | 2/1988 | Mears | 43/25 |
| 4,730,409 | 3/1988 | Mitchell et al. | 30/296 R X |

*Primary Examiner*—Hien H. Phan
*Attorney, Agent, or Firm*—Senniger, Powers, Leavitt and Roedel

[57] ABSTRACT

A cutter for cutting fishing line attached to a lure by means of knot, comprising a plate-like member having two generally parallel and substantially planar faces spaced apart a distance corresponding to the thickness of the member, and an outer peripheral edge. Extending inwardly in the member from the peripheral edge is a first slot having a width slightly greater than the cross sectional dimension of the fishing line to permit entry of the fishing line into the slot but less than the cross sectional dimension of the knot to prevent entry of the knot into the slot. A first blade associated with the plate-like member has a cutting edge positioned at the inner end of the first slot whereby fishing line may be entered into the slot and, with the knot bearing against one of the planar faces, pulled against the cutting edge of the first blade to cut the line.

7 Claims, 1 Drawing Sheet

U.S. Patent   Jan. 30, 1990   4,896,422
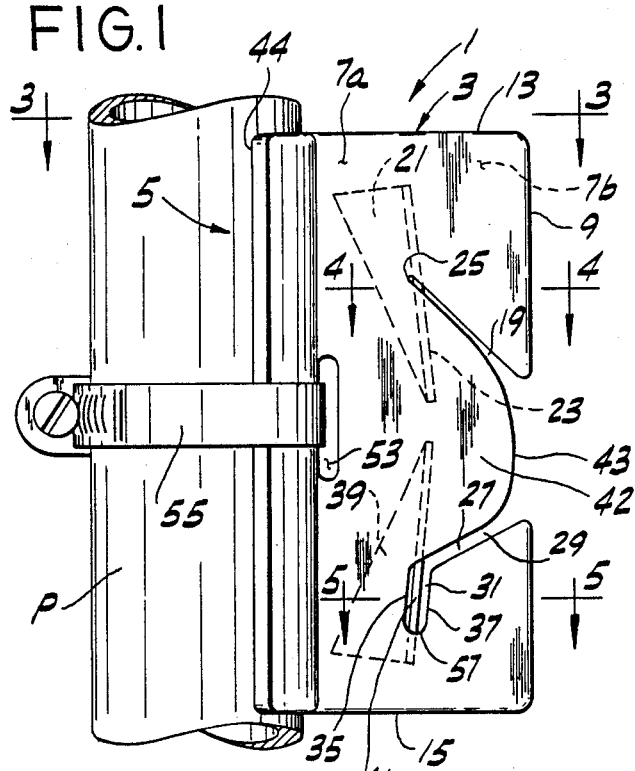
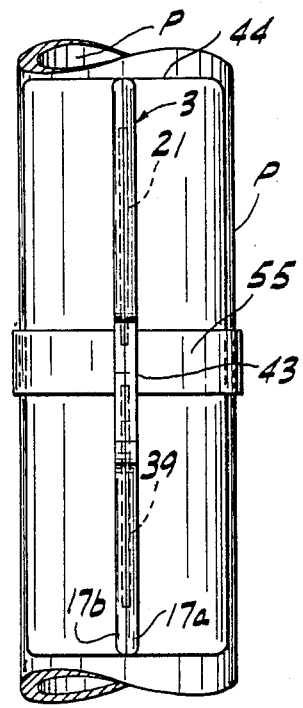
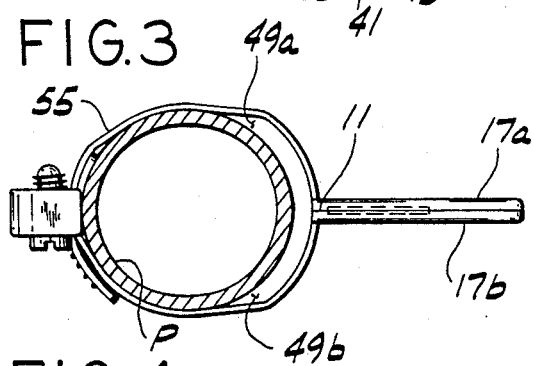
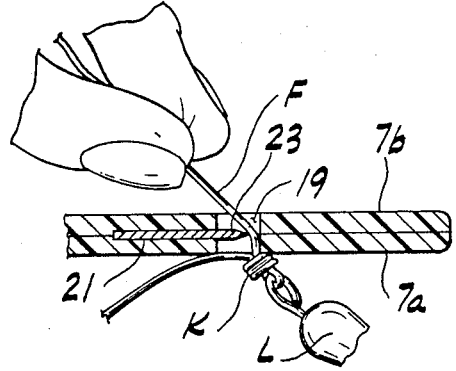
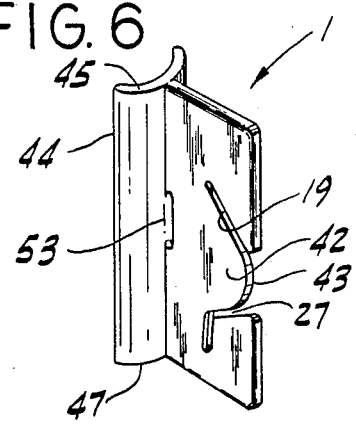
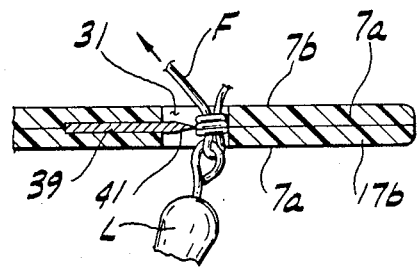

FISHING LINE CUTTER

BACKGROUND OF THE INVENTION

This invention relates generally to cutting apparatus and, more particularly, to a device for cutting fishing line.

One of the inconveniences associated with fishing, especially bass boat fishing, is attaching lures to fishing line and removing lures from a fishing line. The former procedure involves cutting off excess line after the lure has been attached; the latter involves cutting through a knot in the line. These cutting operations can be especially aggravating at night when it is dark and thus difficult to locate and use the necessary equipment. There is, therefore, a need for a device for quickly, easily and safely cutting fishing line to facilitate attachment of a lure to a line and removal of a lure from a line.

Reference may be made to U.S. Pat. Nos. 4,144,605 and 4,484,368 disclosing devices generally in the filed of this invention. It will be noted, however, that such devices are complicated by moving parts and other features.

SUMMARY OF THE INVENTION

Among the several objects of this invention may be noted the provision of a device for quickly cutting fishing line as may be needed in the attachment of a lure to a fishing line or in the quick removal of a lure from a fishing line; the provision of such a device which is simple and safe to use, and economical to manufacture; and the provision of such a device which may be mounted on the pedestal of a boat seat, for example, for greater convenience of use.

In its simplest form, a cutter of the present invention is useful for cutting fishing line attached to a lure by means of knot. The cutter comprises a plate-like member having two generally parallel and substantially planar faces spaced apart a distance corresponding to the thickness of the member, an outer peripheral edge, a first slot in said member extending inwardly from the peripheral edge and having a width slightly greater than the cross sectional dimension of the fishing line to permit entry of the fishing line into the slot but less than the cross sectional dimension of the knot to prevent entry of the knot into the slot, and a first blade associated with the plate-like member having a cutting edge positioned at the inner end of the slot whereby fishing line may be entered into the slot and, with the knot bearing against one of said planar faces, pulled against the cutting edge of the first blade to cut the line adjacent the knot.

Other objects and features will be in part apparent and in part pointed out hereinafter.

BRIEF DESCRIPTION OF THE DRAWINGS

FIG. 1 is a side elevational view illustrating a cutter of this invention mounted on the pedestal of a boat seat;

FIG. 2 is an edge of the cutter of the present invention;

FIG. 3 is a horizontal section taken along line 3—3 of FIG. 1;

FIG. 4 is an enlarged horizontal section taken along line 4—4 of FIG. 1 illustrating how the cutter is used to cut fishing line;

FIG. 5 is an enlarged horizontal section taken along line 5—5 of FIG. 1 illustrating how the cutter is used to cut a knot in a fishing line; and FIG. 6 is a perspective view of the cutter of the present invention.

Corresponding reference characters indicate corresponding parts throughout the several views of the drawings.

DESCRIPTION OF THE PREFERRED EMBODIMENT

Referring to the drawings, particularly FIGS. 1 and 6, a fishing line cutter of the present invention, designated in its entirety by the reference numeral 1, is shown mounted on the pedestal P of a boat seat. The cutter is useful for cutting fishing line F attached to a lure L by means of knot K and for cutting the knot K adjacent the lure to detach the lure from the line.

The fishing line cutter comprises a substantially rectangular plate, generally designated 3, and means indicated generally at 5 for mounting the plate on the pedestal P in a position wherein the plate extends in a generally vertical plane. The plate has two generally parallel and substantially planar faces 7a, 7b spaced apart a distance corresponding to the thickness of the plate, and an outer peripheral edge comprising an outer side edge 9, an inner side edge 11, a top edge 13 and a bottom edge 15. The plate 3 is preferably of laminated construction, comprising a pair of laminates 17a, 17b secured together in face-to-face relation. The laminates 17a, 17b may be formed of suitable plastic and bonded together by epoxy or the like, although other plate materials and means of securement may be used.

A first slot 19 angles inwardly and upwardly from the outer side edge 9 of the plate toward the top edge 13 of the plate. The width of the slot 19 is slightly greater than the cross-sectional dimension of the fishing line F but less than the cross-sectional dimension of the knot K to permit entry of the fishing line F into the slot but to prevent entry of the knot K into the slot. The width of the slot 19 as viewed in FIG. 4 appears larger than the true width of the slot due to the inclination of the view with respect to the slot.

A first blade 21 having a first cutting edge 23 is sandwiched between the laminates 17a, 17b and bonded thereto by an epoxy adhesive or the like. The blade 21 is shown as having a generally triangular shape although other shapes are possible. The blade 21 is so positioned that a portion of its cutting edge 23 is exposed at the inner end 25 of the first slot 19. The cutting edge 25 of the blade is inclined with respect to the first slot 19, thereby exposing a greater length of the edge 25 than if perpendicular to the slot. The recession of the cutting edge 25 in the slot reduces the likelihood of injuries to the user caused by accidental contact with the sharp cutting edge.

The plate 3 also has a second slot 27 therein having a first reach 29 angling inwardly and downwardly from the outer side edge 9 of the plate toward the bottom edge 15, and a second reach 31 extending generally vertically down from the inner end of the first reach. The second reach 31 of slot 27 has an inner edge 35 and an outer edge 37. The width of the second slot 27 is slightly greater than the cross sectional dimension of the knot K but less than the cross sectional dimension of the lure L to permit entry of the knot K into the slot but to prevent entry of the lure L into the slot. The width of the second reach 31 of slot 27 as viewed in FIG. 5 appears somewhat larger than the true width of the slot due to the slight inclination of the view with respect to the reach.

A second blade 39 having a cutting edge 41 is sandwiched between the laminates 17a, 17b and bonded thereto by an epoxy adhesive or the like. The second blade 39 is also shown as having a triangular shape, but other shapes are possible. The second blade 39 is so positioned that a portion of its cutting edge 41 is exposed in the second reach 31 of slot 27 adjacent the inner edge 35 of the reach. Cutting edge 41 extends generally parallel to the outer edge 37 of the second reach and is spaced a sufficient distance therefrom to permit the knot K to be moved from the first reach 29 into the second reach 31 of slot 27. The recession of cutting edge 41 in slot 27 reduces the likelihood of injuries to the user caused by accidental contact with the sharp cutting edge.

It will be noted that the two slots 19, 27 define therebetween a center portion of the plate designated 42 having an outer edge 43 which is inwardly offset with respect to the outer edge 9 of the plate. This offset facilitates entry of fishing line into the slots, especially when visibility is poor, as at night.

Mounting means 5 comprises an arcuate mounting flange 44 affixed to the inner side edge 11 of the plate, the flange having a top edge 45, a bottom edge 47, and side edges 49a, 49b. The plate 3 extends laterally outwardly from the flange 44 in a generally radial direction midway between the side edges 49a, 49b of the flange, the top edge 45 and bottom edge 47 of the flange being flush with the top and bottom edges 13, 15 of the plate, respectively. The curvature of the flange 44 corresponds to the curvature of the pedestal P to facilitate mounting of the cutter thereon. A retaining slot 53 in the plate 3 adjacent its inner side edge 11 midway between the top and bottom edges 13, 15 of the plate is adapted to receive a worm-drive band clamp 55 for securing the cutter 1 to the pedestal P. It will be understood that the invention is not limited to being mounted on the pedestal P of a boat seat, and that it may be mounted on any rigid member sufficiently anchored to resist pulling of the fishing line F or knot K against the blades.

As illustrated in FIG. 4, the fishing line F may be cut adjacent the knot K by entering the line into the first slot 19 generally crosswise to the plate 3 with the knot K adjacent one face 7a of the plate. The line is then pulled away from the other face 7b of the plate while being pulled upwardly and inwardly generally parallel to the first slot 19 to draw the knot towards the plate 3 and to draw the fishing line F towards cutting edge 23, respectively. With the knot K bearing against one face 7a and the line F bearing against the first cutting edge 23 as shown in FIG. 4, the pull on the line is continued to sever the line adjacent the knot.

The knot K on the fishing line F may be cut to remove the lure L from line F by entering the line into the first reach 29 of the second slot 27 generally crosswise to the plate 3 with the lure L adjacent one face 7a of the plate. The fishing line F is then pulled away from the other face 7b of the plate while being pulled downwardly and inwardly to draw the lure L towards the plate 3 and to draw the knot K along reach 29 of slot 27 towards cutting edge 41, respectively. With the lure L bearing against one face 7a and the knot K bearing against cutting edge 41 as shown in FIG. 5, the line is then pulled generally downward to slide the knot K down through the second reach 31 of slot 27 while bearing against the cutting edge 41. Should the knot K not be severed after being pulled to the bottom end 57 of the second reach 31, the fishing line F may be pulled generally upward to draw the knot back up through the second reach 31 while bearing against cutting edge 41. This back-and-forth movement of the knot K through the second reach 31 is repeated until the knot K is cut and the lure L detached from the fishing line F.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A cutter for cutting fishing line attached to a lure by means of a knot, comprising a plate-like member having two generally parallel and substantially planar faces spaced apart a distance corresponding to the thickness of said member, an outer peripheral edge, a first slot in said member extending inwardly from said peripheral edge and having a width slightly greater than the cross sectional dimension of the fishing line to permit entry of the fishing line into the slot but less than the cross sectional dimension of the knot to prevent entry of the knot into the slot, and a first blade associated with said plate-like member having a cutting edge positioned at the inner end of the slot whereby fishing line may be entered into the slot and, with the knot bearing against one of said planar faces, pulled against the cutting edge of the first blade to cut the line adjacent the knot, and wherein said plate-like member has a second slot therein extending inwardly from said peripheral edge and having a width slightly greater than the cross sectional dimension of the knot to permit entry of the knot into the slot but less than the cross sectional dimension of the lure to prevent entry of the lure into the slot, a second blade associated with said plate-like member having a cutting edge positioned at the inner edge of the second slot whereby the knot on a fishing line may be entered into the slot and, with the lure bearing against one of said planar faces, pulled against the cutting edge of the second blade to cut the knot and thereby detach the lure from the line.

2. A cutter as set forth in claim 1 wherein said second slot comprises a first reach extending inwardly from said peripheral edge and a second reach at the inner end of said first reach running at an angle relative to said first reach and generally parallel to the cutting edge of the second blade to permit movement of the knot along the blade to facilitate cutting of the knot.

3. A cutter as set forth in claim 2 further comprising means for mounting said plate-like member on the pedestal of a boat seat in a position wherein the platelike member lies in a generally vertical plane.

4. A cutter as set forth in claim 3 wherein said plate-like member has a side edge, constituting said outer peripheral edge, a top edge and a bottom edge, one of said first and second slots angling inwardly and upwardly from said side edge toward said top edge and the other of said slots angling inwardly and downwardly from said side edge toward said bottom edge.

5. A cutter as set forth in claim 4 wherein said plate-like member comprises a pair of plates secured together in face-to-face relation with said first and second blades sandwiched therebetween in fixed position.

6. A cutter for cutting fishing line attached to a lure by means of a knot, comprising a plate-like member and means for mounting said plate-like member on the pedestal of a boat seat in a position wherein said plate-like member lies in a generally vertical plane, said plate-like member having two generally parallel and substantially planar faces spaced apart a distance corresponding to the thickness of said member, a side edge, a top edge, a bottom edge, and a first slot in said member extending inwardly from said side edge and angling upwardly toward said top edge and having a width slightly greater than the cross sectional dimension of the fishing line to permit entry of the fishing line into the slot but less than the cross sectional dimension of the knot to prevent entry of the knot into the slot, a first blade associated with said plate-like member having a cutting edge positioned at the inner end of the slot whereby fishing line may be entered into the slot and, with the knot bearing against one of said planar faces, pulled against the cutting edge of the first blade to cut the line adjacent the knot, and wherein said plate-like member has a second slot therein extending inwardly from said side edge and having a width slightly greater than the cross sectional dimension of the knot to permit entry of the knot into the slot but less than the cross sectional dimension of the lure to prevent entry of the lure into the slot, a second blade associated with the plate-like member having a cutting edge positioned at the inner end of the second slot whereby the knot on a fishing line may be entered into the slot and, with the lure bearing against one of said planar faces, pulled against the cutting edge of the second blade to cut the knot and thereby detach the lure from the line.

7. A cutter as set forth in claim 6 wherein said second slot comprises a first reach extending inwardly and downwardly from said side edge of the plate-like member and a second reach at the inner end of said first reach running at an angle relative to said first reach and generally parallel to the cutting edge of the second blade to permit movement of the knot along the blade to facilitate cutting of the knot.

* * * * *

UNITED STATES PATENT AND TRADEMARK OFFICE
CERTIFICATE OF CORRECTION

PATENT NO. : 4,896,422

DATED : January 30, 1990

INVENTOR(S) : Larry A. Sheehan and John R. James

It is certified that error appears in the above-identified patent and that said Letters Patent is hereby corrected as shown below:

Column 4, line 41, "inner edge", should read ---inner end---.

Signed and Sealed this

Nineteenth Day of February, 1991

Attest:

HARRY F. MANBECK, JR.

*Attesting Officer*    *Commissioner of Patents and Trademarks*